US011902764B2

(12) United States Patent
Liu et al.

(10) Patent No.: US 11,902,764 B2
(45) Date of Patent: Feb. 13, 2024

(54) MAGNETIC CIRCUIT STRUCTURE OF A TRANSDUCER, A TRANSDUCER AND AN ELECTRONIC DEVICE COMPRISING THE SAME

(71) Applicant: GOERTEK INC., Shandong (CN)

(72) Inventors: Chunfa Liu, Shandong (CN); Fenglei Zu, Shandong (CN); Xinfeng Yang, Shandong (CN)

(73) Assignee: GOERTEK INC., Weifang (CN)

( * ) Notice: Subject to any disclaimer, the term of this patent is extended or adjusted under 35 U.S.C. 154(b) by 199 days.

(21) Appl. No.: 17/628,272

(22) PCT Filed: Aug. 13, 2019

(86) PCT No.: PCT/CN2019/100301
§ 371 (c)(1),
(2) Date: Jan. 19, 2022

(87) PCT Pub. No.: WO2021/012325
PCT Pub. Date: Jan. 28, 2021

(65) Prior Publication Data

US 2022/0286782 A1 Sep. 8, 2022

(30) Foreign Application Priority Data

Jul. 19, 2019 (CN) ......................... 201910657146.6

(51) Int. Cl.
*H04R 9/02* (2006.01)
*H04R 9/06* (2006.01)
*H04R 1/02* (2006.01)

(52) U.S. Cl.
CPC ............. *H04R 9/025* (2013.01); *H04R 1/025* (2013.01); *H04R 9/06* (2013.01)

(58) Field of Classification Search
None
See application file for complete search history.

(56) References Cited

U.S. PATENT DOCUMENTS 8,917,154 B2 12/2014 Fullerton et al.
9,942,663 B1 * 4/2018 Salvatti .................. H04R 9/025
2014/0320248 A1 10/2014 Fullerton et al.

FOREIGN PATENT DOCUMENTS

CN 103731064 A 4/2014
CN 205017577 U 2/2016
(Continued)

OTHER PUBLICATIONS

International Search Report from International Application No. PCT/CN2019/100301 dated Apr. 10, 2020.

*Primary Examiner* — James K Mooney
(74) *Attorney, Agent, or Firm* — Shih IP Law Group, PLLC

(57) ABSTRACT

Disclosed is a magnetic circuit structure of a transducer comprising a static magnetic field generating device which comprises magnet sets, the magnet sets comprise a first magnet set magnetized in a moving direction of the transducer, a second magnet set and a third magnet set located in a direction orthogonal to a static magnetic field generated by the first magnet set, a magnetization direction of the second magnet set is orthogonal to that of the first magnet set, a magnetization direction of the third magnet set is orthogonal to that of the second and first magnet sets, the second and third magnet sets increase a magnetic induction intensity of the static magnetic field. The magnetic circuit structure of the transducer in the present disclosure can effectively solve the problem that a driving force of the transducer applying thereof is not sufficient, thus increasing the efficiency of electric-to-mechanical conversion.

14 Claims, 10 Drawing Sheets

(56) References Cited

FOREIGN PATENT DOCUMENTS

| | | | | |
|---|---|---|---|---|
| CN | 103731064 B | | 8/2016 | |
| CN | 109040916 A | * | 12/2018 | ............. H04R 9/025 |
| JP | 2004056771 A | | 2/2004 | |

* cited by examiner

MAGNETIC CIRCUIT STRUCTURE OF A TRANSDUCER, A TRANSDUCER AND AN ELECTRONIC DEVICE COMPRISING THE SAME

TECHNICAL FIELD

The present disclosure relates to a magnetic circuit structure of a transducer, and a transducer and an electronic device using the magnetic circuit structure.

BACKGROUND ART

Taking micro transducers as an example, various micro transducers are generally used in various small portable consumer electronic products such as mobile phones, tablet computers, laptops, etc., as main devices for outputting a sound radiation and achieving a certain displacement or vibration energy. Due to design requirements for small size and thin thickness, the micro transducers are designed completely different from traditional large transducers:

1. Vibration strokes of micro transducers are much smaller than that of large transducers, but in order to improve low frequency performances, amplitudes are provided to approach limits of design sizes thereof; 2. In order to adapt to ultra-thin designs which are generally designed in flat wide forms or flat long forms, the micro transducers have to fully adapt to and utilize this feature; 3. Due to the above size limitations, the micro transducers usually cannot make full use of the performances of each component, resulting in low conversion efficiency and increased power consumption; and 4. A first-order resonance region is generally a main working region of the micro transducers, but due to the size limitations, a first-order resonant frequency cannot be too low, which seriously affects the low-frequency performance of the device.

Traditional micro transducers mainly include the following types:

a. Moving-iron transducer: The principle thereof is to use a central armature to drive a vibration system to produce sound or vibrate, wherein the armature is a cantilever with one end fixed and mainly has a U-shaped or T-shaped structure. Such a design is only applicable to a size of an ultra-small device. As the size increases, an armature line is too long, a magnetic field attenuates greatly along a path thereof, and there will be a large magnetic leakage at a bending area (clamping area) thereof, resulting in a rapid decline of driving performance.

b. Moving-coil transducer: For example, micro loudspeakers are applicable to products with large lengths and large widths. A force generated by an energized coil in a static magnetic field is applied as a main driving force, and the coil drives a vibration suspension system to produce sound. The energized coil itself is not magnetic conductive and cannot effectively converge the magnetic field, and in a vibration gap thereof, a magnetic leakage is relatively higher. At the same time, a magnetic conductive material may be used to connect internal and external magnetic fields in a closed loop, but due to limitations of thickness and size, saturation magnetic flux density in the magnetic conductive material is high, which also leads to high magnetic leakage, resulting in a low energy conversion efficiency.

c. Vibration transducer (motor): The principle thereof is that an excitation with the same frequency is applied at a resonance frequency of the vibration system, because of a characteristic of low damping of the system, the vibration system has an intense resonance. There are many ways for excitation, such as excitation ways similarly as that of moving-coil loudspeakers, rotor motors, etc. However, they have relatively low energy conversion efficiency, which results in a long start and stop time.

The transducers in the prior art are difficult to meet requirements for higher performance of electronic products. The applicant proposes a magnetic-potential transducer to improve electric-to-mechanical conversion efficiency of the transducer. On this basis, in order to further improve a driving efficiency of the magnetic-potential transducer, it is necessary to optimize a static magnetic field generating mechanism in the magnetic-potential transducer.

SUMMARY

The technical problem to be solved by the present disclosure is to optimize a design of a magnetic circuit structure and improve magnetic induction intensity of the magnetic circuit structure while maintaining lightness and thinness of existing micro transducers, to meet application requirements of electronic products for transducers.

According to an aspect of the present disclosure, there is provided a magnetic circuit structure of a transducer, wherein the magnetic circuit structure comprises a static magnetic field generating device, the static magnetic field generating device includes magnet sets, wherein the magnet sets comprise a first magnet set that is magnetized in a moving direction of the transducer, and a second magnet set and a third magnet set that are located in a direction orthogonal to a static magnetic field generated by the first magnet set, and wherein a magnetization direction of the second magnet set is orthogonal to a magnetization direction of the first magnet set, a magnetization direction of the third magnet set is orthogonal to the magnetization directions of the second magnet set and the first magnet set, and the second magnet set and third magnet set are provided to increase magnetic induction intensity of the static magnetic field.

As an improvement, the first magnet set comprises at least two permanent magnets disposed opposite to each other to form the static magnetic field, the second magnet set comprises first magnetism gathering permanent magnets disposed on both sides of at least one of the permanent magnets, and the third magnet set comprises second magnetism gathering permanent magnets located on both sides of the static magnetic field and between the first magnet set and the second magnet set.

As an improvement, the first magnet set includes a first permanent magnet and a second permanent magnet disposed opposite to each other in the moving direction of the transducer, the first permanent magnet and the second permanent magnet are magnetized in the moving direction of the transducer and form the static magnetic field in the moving direction of the transducer, and adjacent ends of the first permanent magnet and the second permanent magnet have opposite polarities.

As an improvement, the second magnet set comprises a fourth magnet set and a fifth magnet set respectively disposed on both sides of the first permanent magnet and the second permanent magnet, and wherein each of the fourth magnet set and the fifth magnet set includes two permanent magnets disposed opposite to each other and located in a direction orthogonal to the static magnetic field, and the two permanent magnets are magnetized in a direction orthogonal to the moving direction and are configured to have the same polarities at ends close to the first permanent magnet and the second permanent magnet.

As an improvement, a volume of the second permanent magnet is smaller than a volume of the first permanent magnet, wherein the fifth magnet set includes a third permanent magnet and a fourth permanent magnet disposed on both sides of the second permanent magnet, and wherein the third permanent magnet and the fourth permanent magnet are magnetized in a direction orthogonal to the static magnetic field, and have the same polarities at ends close to the second permanent magnet.

As an improvement, the permanent magnets for generating the static magnetic field are disposed in pairs and the permanent magnets of each pair are opposite to each other, the permanent magnets are magnetized in the moving direction of the transducer, and polarities of opposite ends of the permanent magnets that are opposite to each other of each pair are configured to be opposite, wherein a third magnet set is correspondingly provided between two adjacent sets of permanent magnets on each side of the static magnetic field; and wherein the third magnet set is provided with at least two second magnetism gathering permanent magnets, and polarities of the two second magnetism gathering permanent magnets at ends close to the same static magnetic field are configured to be opposite.

As an improvement, the third magnet set is arranged in the middle of the magnetic circuit structure of the transducer.

As an improvement, there are two first permanent magnet and two second permanent magnet located on the same side of the static magnetic field, directions of magnetic induction lines inside the two first permanent magnets are opposite, and directions of magnetic induction lines inside the two second permanent magnets are opposite; and wherein the third magnet set comprises two second magnetism gathering permanent magnets respectively disposed between the two first permanent magnets and between the two second permanent magnets, and directions of magnetic induction lines inside the two third magnet sets are opposite.

The magnetic circuit structure of the transducer provided by the present disclosure includes the first magnet set, the second magnet set and the third magnet set. The magnetic induction intensity of the static magnetic field is effectively improved through the arrangement of the three magnet sets orthogonal to each other and the orthogonal arrangement of internal magnetization directions.

The present disclosure also provides a transducer comprising a fixed member and a movable member, the fixed member includes the above-mentioned magnetic circuit structure of the transducer.

As an improvement, the transducer is a magnetic-potential transducer, and the transducer further comprises:

- at least one alternating magnetic field generating device configured to generate an alternating magnetic field, the alternating magnetic field is orthogonal or partially orthogonal to the static magnetic field; and
- at least one movable device provided with a magnetic conductive material, at least a part of the magnetic conductive material is arranged in an area where the alternating magnetic field overlaps with the static magnetic field, so that the static magnetic field and the alternating magnetic field are converged, wherein a magnetic field force generated by an interaction between the static magnetic field and the alternating magnetic field is applied to the magnetic conductive material so as to drive the movable device to move.

As an improvement, a suspension device is further included, the magnetic conductive material and the suspension device move together as a whole, and the movable device is suspended in a space where the static magnetic field is located by the suspension device.

As an improvement, the transducer moves in a vertical direction, the first magnet set is magnetized in the vertical direction, and the second magnet set is magnetized in a horizontal direction.

According to the magnetic-potential transducer with a new structure provided by the present disclosure, a magnetic conductive material is provided on the movable device, the static magnetic field and the alternating magnetic field are disposed on the magnetic-potential transducer, and the magnetic field force generated by the interaction between the static magnetic field and the alternating magnetic field is applied to the magnetic conductive material so as to drive the movable device to move. The law of the interaction between the static magnetic field and the alternating magnetic field conforms to the expression of the principle of magnetic potential, that is, the principle of magneto-motive force balance. The total magnetic potential of the system remains unchanged within a certain range and the magnetic field is distributed in accordance with the principle of minimum potential energy of current and magnetic flux. The driving force may be effectively improved by the magnetic-potential transducer designed according to the principle of magnetic potential while maintaining lightness and thinness of existing micro transducers.

In addition, the static magnetic field generating device may form higher magnetic induction intensity in a predetermined area, thereby increasing the driving force of the movable member.

According to the magnetic-potential transducer with a new structure provided by the present disclosure, an anti-stiffness generated by the magnetic conductive material in the static magnetic field, which is also referred to as magnetic stiffness, is fully utilized. Wherein, the magnetic field force is proportional to the displacement of the movable member and their directions are consistent, and a ratio of variation of the magnetic field force with respect to the displacement is defined as the magnetic stiffness. The anti-stiffness may effectively reduce the stiffness of the system without changing the product size, that is, the anti-stiffness is superimposed with the stiffness provided by the elastic recovery device in the suspension system to form the stiffness of the system. The stiffness of the system and the mass of the system jointly determine the low-frequency resonant frequency of the system, thus, the low-frequency resonant frequency of the system may be further reduced by reducing the stiffness of the system through the anti-stiffness, thereby further improving the low-frequency performance of the device.

According to another aspect of the present disclosure, there is provided an electronic device including the above-mentioned magnetic-potential transducer.

As an improvement, the electronic device may be a mobile phone, a tablet, a TV, a car audio or a loudspeaker box.

The electronic device applying the magnetic-potential transducer according to present disclosure meets the use requirements of current electronic products for transducers.

Other features and advantages of the present disclosure will be apparent from the following detailed description of exemplary embodiments of the present disclosure with reference to the accompanying drawings.

BRIEF DESCRIPTION OF THE DRAWINGS

The drawings, which are incorporated in the specification and constitute a part of the specification, show embodiments of the present disclosure, and are used to explain the principle of the present disclosure together with the description. In the drawings.

DETAILED DESCRIPTION OF THE EMBODIMENTS

Figure 1:
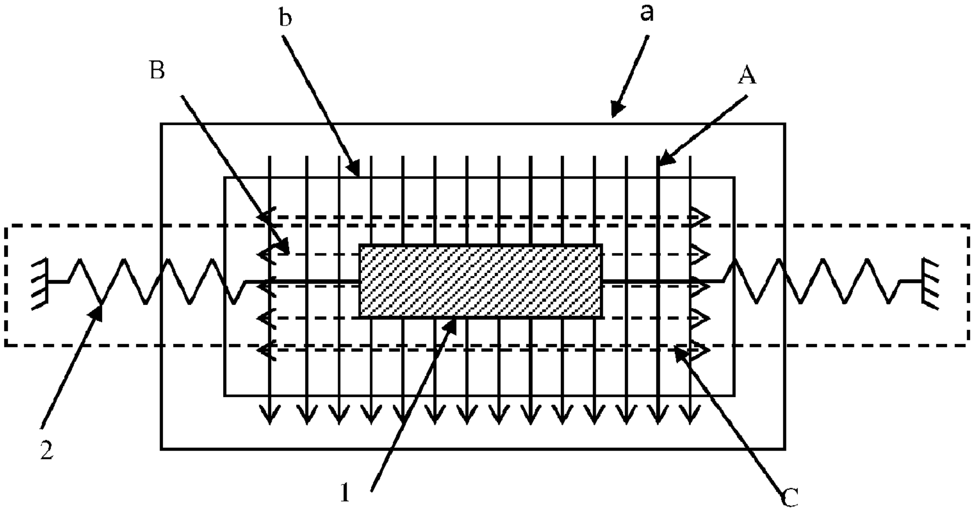
FIG. 1 is a schematic diagram of an overall structure of a magnetic-potential transducer according to an embodiment of the present disclosure.

Various exemplary embodiments of the present disclosure will now be described in detail with reference to the accompanying drawings. It should be noted that unless specifically stated otherwise, the relative arrangement, numerical expressions and numerical values of the components and steps set forth in the embodiments do not limit the scope of the present disclosure.

The following description of at least one exemplary embodiment is merely illustrative in fact and is in no way intended to be used as any limitation to the present disclosure and its application or use.

The technologies, methods and devices known to those of ordinary skill in the relevant field may not be discussed in detail, but where appropriate, the technologies, methods and devices shall be regarded as a part of the specification.

In all examples shown and discussed herein, any specific value should be construed as merely exemplary and not as a limitation. Therefore, other examples of the exemplary embodiments may have different values.

It should be noted that similar reference numerals and letters refer to similar items in the following drawings. Therefore, once an item is defined in one drawing, it does not need to be further discussed in subsequent drawings.

Figure 15:
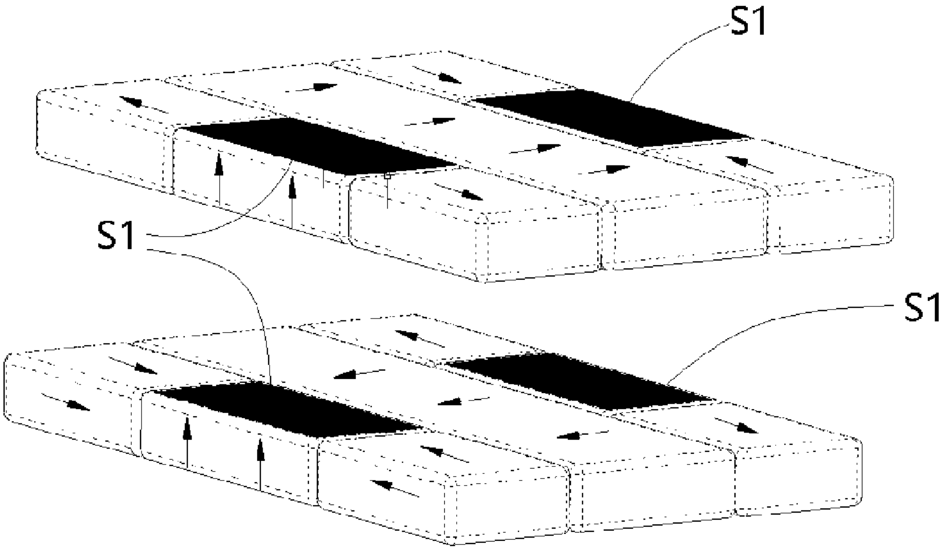
FIGS. 15-17 are schematic diagrams of the static magnetic field generating device according to embodiments of the disclosure.
Figure 16:
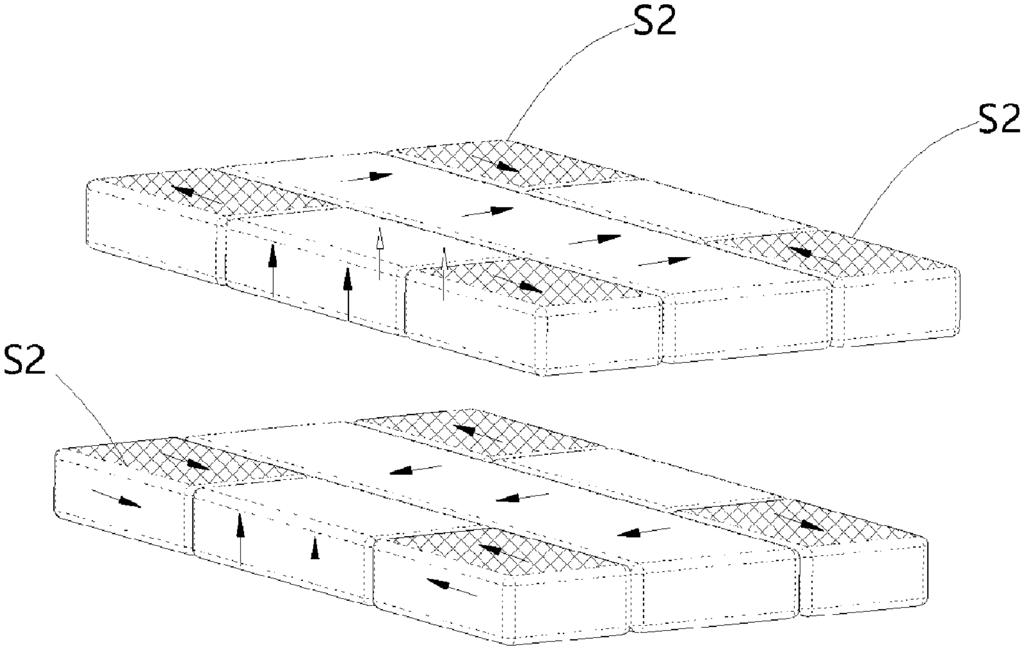
Figure 17:
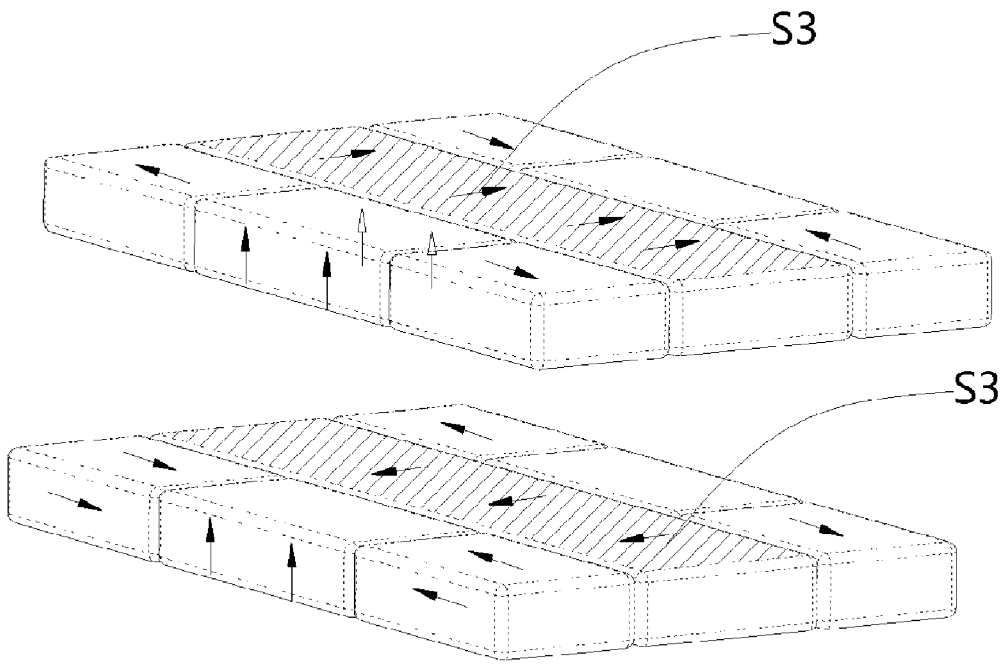

According to an aspect of the present disclosure, there is provided a static magnetic field generating device. As illustrated in FIGS. 15-17, the static magnetic field generating device includes magnet sets, the magnet sets include a first magnet set S1 that is magnetized along a moving direction of the transducer, and a second magnet set S2 and a third magnet set S3 that are located in a direction orthogonal to a static magnetic field generated by the first magnet set S1. For example, the third magnet set S3 is disposed in a direction orthogonal to static magnetic fields generated by the first magnet set S1 and the second magnet set S2. The magnetization direction of the second magnet set S2 is orthogonal to the magnetization direction of the first magnet set S1, and the magnetization direction of the third magnet set S3 is orthogonal to the magnetization directions of the second magnet set S2 and the first magnet set S1, and the second magnet set S2 and third magnet set S3 are configured to increase magnetic induction intensity of the static magnetic field.

Hereinafter, the present disclosure will be further explained in conjunction with the accompanying drawings.

FIG. 1 is a schematic diagram of an overall structure of a magnetic-potential transducer according to an embodiment of the present disclosure. The magnetic-potential transducer includes a fixed member and a movable member C. Wherein, the fixed member includes a static magnetic field generating device a, which may generate a static magnetic field A in the magnetic-potential transducer; and an alternating magnetic field generating device b, which may generate an alternating magnetic field B, that is, an alternating electromagnetic field, in the magnetic-potential transducer. The static magnetic field A and the alternating magnetic field B are orthogonal to each other. Of course, in some cases, the static magnetic field A and the alternating magnetic field B may not be completely orthogonal, for example, may be partially orthogonal to each other, which does not affect the implementation of the embodiment.

The magnetic-potential transducer of the present disclosure further includes the movable member C, which is suspended in the magnetic-potential transducer by a suspension device 2. Specifically, the movable member C includes a movable device provided with a magnetic conductive material 1, and the suspension device 2 at least partially connected to and fixed with the movable device.

Specifically, in the structure as shown in FIG. 1, the direction of the static magnetic field A is disposed to be in a vertical direction, and the direction of the alternating magnetic field B is disposed to be in a horizontal direction, and the two directions are orthogonal. The magnetic conductive material 1 is arranged parallel to the direction of the alternating magnetic field B, i.e., arranged in the horizontal direction. When the alternating magnetic field generating device b is not energized, i.e., when the alternating magnetic field has not been generated, in an ideal state, the magnetic conductive material 1 itself will be affected by a static magnetic force of the static magnetic field A, and the static magnetic force appears to be equal in magnitude and opposite in direction on both sides of the magnetic conductive material 1, thus the overall force of the static magnetic force is 0, and thus the magnetic conductive material 1 may be maintained in an balance position. In other cases, the static magnetic force applied by the static magnetic field A on the magnetic conductive material 1 is not 0, the magnetic conductive material 1 has a tendency to deviate from the balance position, but an elastic restoring force may be provided due to the suspension device 2 to maintain the magnetic conductive material 1 in the original balance position.

When the alternating magnetic field B is generated, the magnetic conductive material 1 itself is located in the area where the static magnetic field A overlaps with the alternating magnetic field B, the magnetic conductive material 1 converges the magnetic fields in the area, and an interaction force will necessarily be generated between the alternating magnetic field B and the static magnetic field A and applied on the magnetic conductive material 1, so that the magnetic conductive material 1 drives the movable member C to move. During the reciprocal motion, as the movable device is connected with the suspension device 2, the suspension device 2 may provide the movable device with an elastic restoring force. That is, when the movable member C moves downward, the suspension device 2 may provide an upward force, and when the movable member C moves upward, the suspension device 2 may provide a downward force. The magnetic conductive material 1 moves as a whole by a whole force applied by the static magnetic field A, the alternating magnetic field B, and the suspension device 2.

It should be noted that according to the present disclosure, the magnetic conductive material 1 moves as a whole in the magnetic-potential transducer means that the magnetic conductive material 1 is freely disposed on the suspension device 2 and its boundary is not clamped on other components, which is essentially different from the U-shaped or T-shaped armature structure of the moving-iron transducer described above. According to the present disclosure, due to the small magnetic conductive material, problems usually occurred in the transducer with the moving-iron structure, for example, the armature line is too long, the magnetic field attenuates greatly along the path thereof, a large magnetic leakage occurs at its bending area (clamping area), are avoid. In the present disclosure, the magnetic conductive material 1 drives the movable member to vibrate through the interaction force between the static magnetic field A and the alternating magnetic field B, and according to the principle of magneto-motive force balance, i.e., the total magnetic potential of the system remains unchanged within a certain range, the magnetic field is distributed in accordance with the principle of minimum potential energy defined by current and magnetic flux. The driving force can be effectively improved according to the principle of magnetic potential while maintaining lightness and thinness of existing micro transducers.

In addition, the design of structure in the present disclosure begins with various structures of magnetic-potential transducers, such as loudspeakers, motors, and multi-functional products with integrated vibration and sound generation, etc. in the field of consumer electronics, as well as automotive electronics, smart audio, etc. in the field of non-consumer electronics, for example, motors and loudspeakers that can output sound radiation and achieve a certain displacement or vibration energy.

The structure and basic working principle of the magnetic-potential transducer of the present disclosure are described above. Each portion constituting the magnetic-potential transducer can be flexibly selected in different constitution forms according to actual needs.

Figure 2:
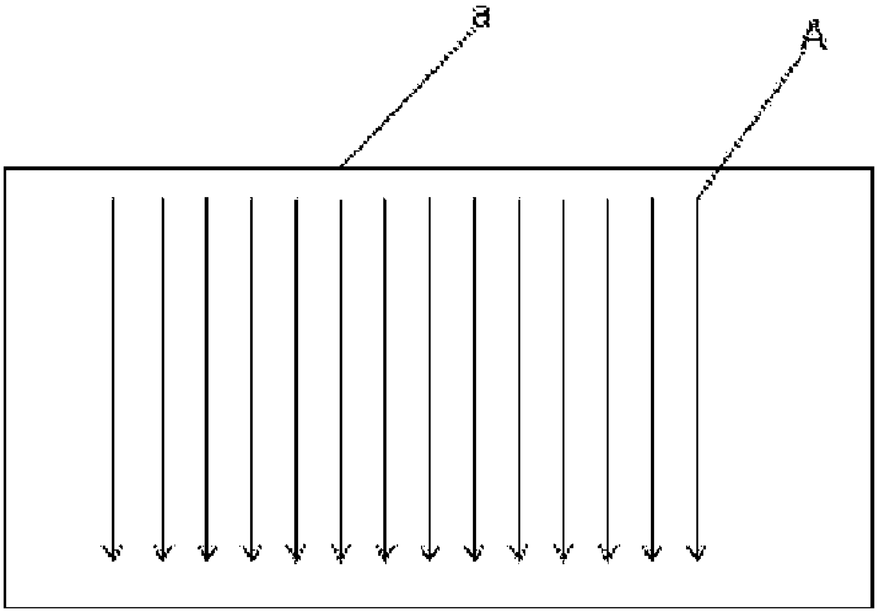
FIG. 2 is a schematic diagram of magnetic induction lines of a static magnetic field of the magnetic-potential transducer according to an embodiment of the present disclosure.
Figure 3:
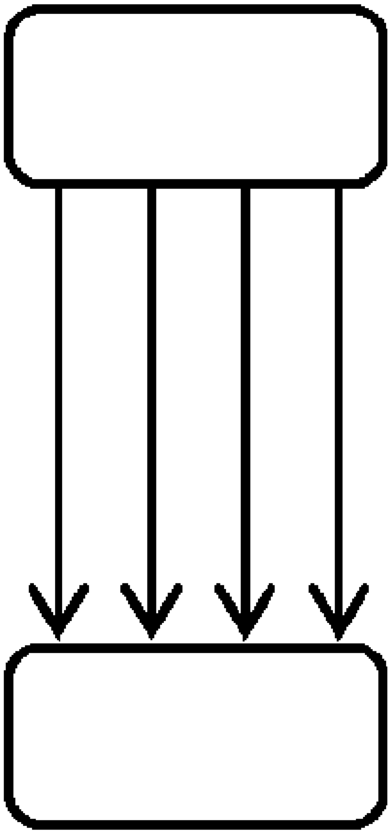
FIG. 3 is a schematic diagram of an alternative structure of a static magnetic field generating device corresponding to the static magnetic field of FIG. 2.

The direction in the static magnetic field A generated by the static magnetic field generating device a, for example, is as shown in FIG. 2, and FIG. 3 illustrates the static magnetic field generating device corresponding to the static magnetic field of FIG. 2. The static magnetic field generating device includes two magnet sets opposite to each other. It will be understand that magnetic poles at corresponding ends of the two magnet sets are opposite, the magnetic pole at the corresponding end of the magnet set on an upper side is an N-pole, and the magnetic pole at the corresponding end of the magnet set on a lower side is an S-pole. The device for generating the static magnetic field A may preferably be a combination of at least two permanent magnets, or a combination of a permanent magnet and an electromagnet, but is not limited by the structure shown above.

Figure 4:
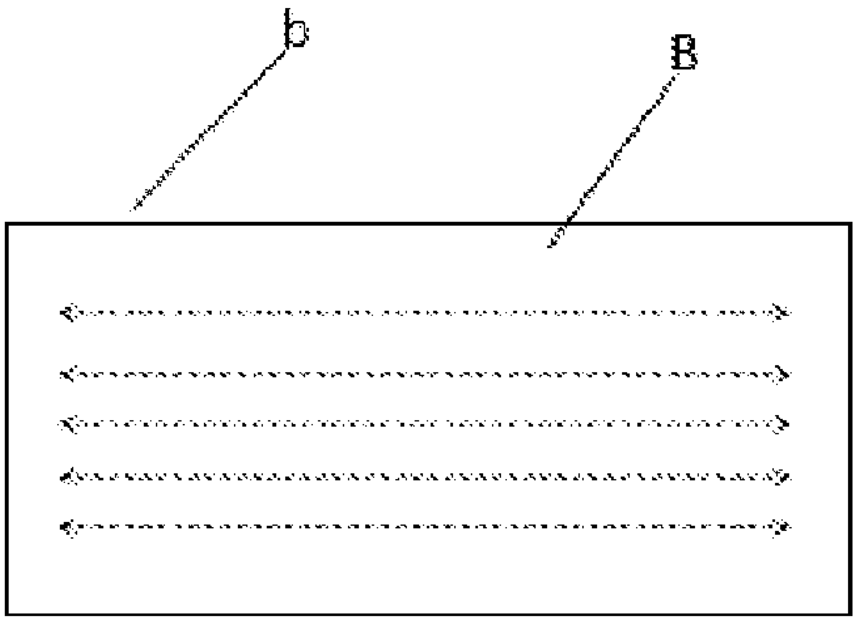
FIG. 4 is a schematic diagram of magnetic induction lines of an alternating magnetic field of the magnetic-potential transducer according to an embodiment of the present disclosure.
Figure 5:
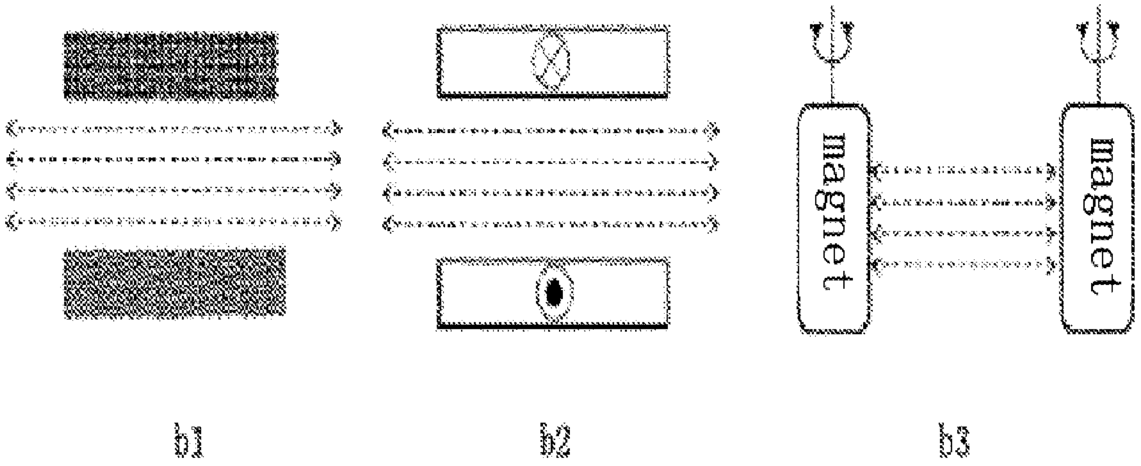
FIG. 5 is a schematic diagram of an alternative structure of an alternating magnetic field generating device corresponding to the alternating magnetic field of FIG. 4.

Referring to FIG. 4, a direction of magnetic induction lines of the alternating magnetic field B generated by the alternating magnetic field generating device b is shown in FIG. 4, and FIG. 5 correspondingly illustrates an optional partial structure of the alternating magnetic field generating device. For example, the structure may be a coil with an alternating current passing through as shown in b1, a conductor with a vortex electric field passing through as shown in b2 or a flipped permanent magnet as shown in b3, all of which may generate the alternating magnetic field B. However, the structure is not limited to the above three, and may be other generating devices.

Preferably, the alternating magnetic field generating device b is a coil arranged along the horizontal direction, and forms an electromagnet with the magnetic conductive material 1. The magnetic conductive material 1 is polarized when the alternating current passes through the coil, and the static magnetic field A is orthogonal to the alternating magnetic field, so that the magnetic conductive material 1 can be driven to reciprocally move through the magnetic field.

It should be noted that FIG. 1 only shows a schematic structure of the present disclosure, and does not represent all implementation forms covered by the present disclosure, and the directions of the static magnetic field A and the alternating magnetic field B are only illustrated as an example of a possible design. It will be understood by those skilled in the art that when the direction of the magnetic field changes, the corresponding directions of the static magnetic field generating device a and alternating magnetic field generating device b will also be adjusted accordingly to meet the requirements for the design of the magnetic field.

Figure 6A:
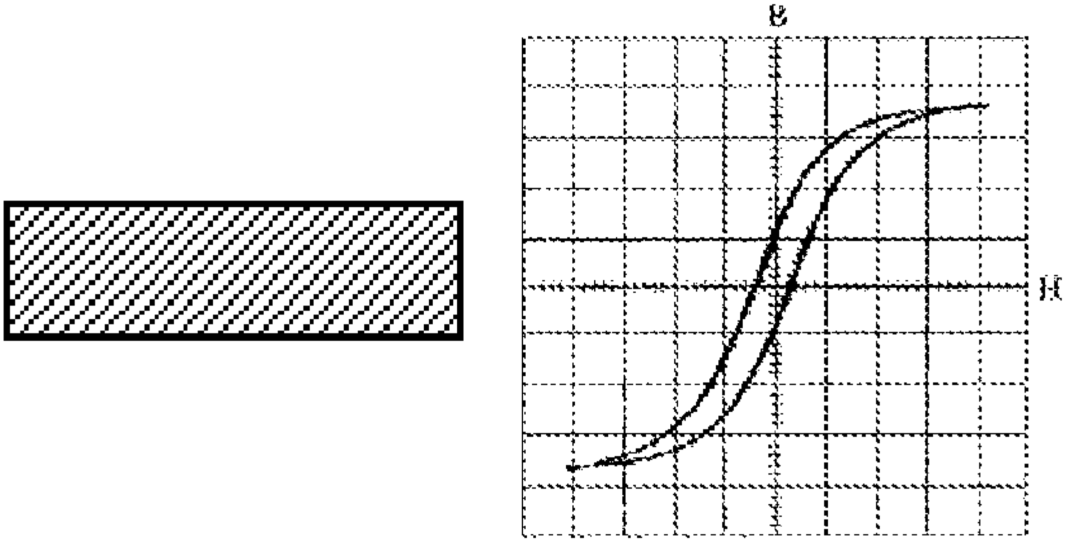
FIG. 6A is a schematic diagram of an alternative structure of a magnetic conductive material in the magnetic-potential transducer according to an embodiment of the present disclosure.
Figure 6B:
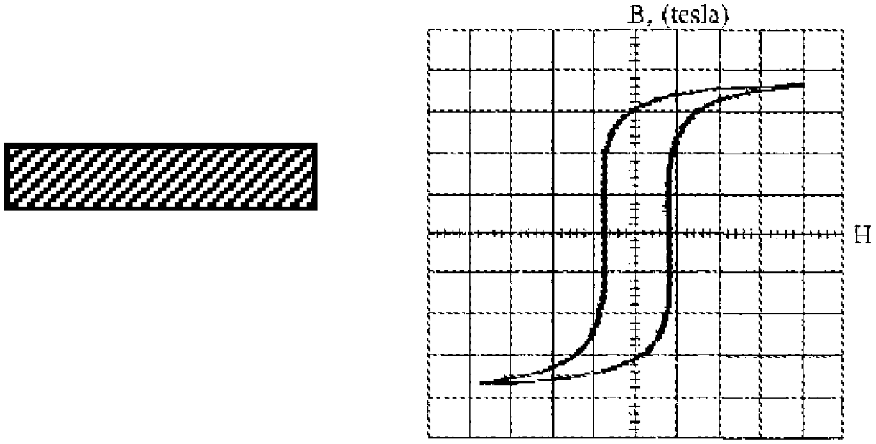
FIG. 6B is a schematic diagram of another alternative structure of the magnetic conductive material in the magnetic-potential transducer according to an embodiment of the present disclosure.

Referring to FIG. 6A, a magnetic conductive material of the magnetic-potential transducer of the present disclosure and a corresponding H-B curve are illustrated. According to the H-B curve, it can be seen that the selected magnetic conductive material is a soft magnetic material. Similarly, referring to FIG. 6B, another magnetic conductive material of the magnetic-potential transducer of the present disclosure and a corresponding H-B curve are illustrated. According to the H-B curve, it can be seen that the selected magnetic conductive material is a weak hard magnetic material.

Preferably, the relative magnetoconductivity of the magnetic conductive material in the movable device is greater than 3000, and the relative magnetoconductivity of the suspension device 2 is less than 1000. Specifically, in order to effectively improve the driving force, the magnetic conductive material 1 in the movable device is preferably a high magnetic conductive material, and the relative magnetoconductivity of the high magnetic conductive material is generally greater than 3000; the suspension device 2 is preferably a weak magnetic or non-magnetic conductive material, and in this case, the suspension device 2 has little interference or influence on the movable device. The materials shown above are relatively preferred materials, and in fact, other types of magnetic conductive materials can be selected.

As for the suspension device 2, one of the main functions of the suspension device 2 is to provide an elastic restoring force for the motion of the movable member C. Based on the function of the suspension device 2, one end thereof need to be fixed on the movable member C, and the other end is fixed on the magnetic-potential transducer. When the movable member C reciprocally moves, the suspension device 2 may provide a force to move it towards the balance position. In an embodiment, the suspension device may be any one or any combination of two or more of a diaphragm, a spring and a leaf spring, etc.

The magnetic-potential transducer provided by the present disclosure has the following advantages compared with conventional transducers in the prior art:

1) Unlike the moving-iron transducer (for example, loudspeaker), in the present disclosure, the movable member is driven by a central magnetic conductive material to produce sound or vibrate, and the magnetic conductive material moves as a whole. It is applicable to products with large length and width and maintains high driving performance, and is more conducive to combination with a mechanical suspension system.
2) Unlike the moving-coil transducer (for example, loudspeaker), in the present disclosure, the principle of magnetic potential is mainly used to generate a driving force through the interaction between the static magnetic field and the alternating magnetic field orthogonal or partially orthogonal to each other, and the efficiency of energy conversion is significantly higher than that of the moving-coil transducer.
3) Unlike the vibration transducer (for example, motor), in the present disclosure, an intense resonance of the system may be caused according to the principle of resonance, and due to its high energy conversion efficiency, the start and stop time may be effectively shortened.
4) The static magnetic field generating device of the present disclosure includes magnet sets. The magnet sets include a first magnet set that is magnetized along a moving direction of the transducer, and a second magnet set and a third magnet set that are located in a direction orthogonal to a static magnetic field generated by the first magnet set. The direction of the magnetic induction lines inside the second magnet set is orthogonal to the direction of the magnetic induction lines inside the first magnet set, and the second magnet set is configured to increase the magnetic induction intensity of the static magnetic field. In the present disclosure, the magnetic induction intensity of the static magnetic field is significantly improved through the interaction of the first magnet set and the second magnet set orthogonal by the static magnetic field, and the magnetic conductive material is driven in the static magnetic field, accordingly, the driving force of the movable member is significantly improved.

The magnetic-potential transducer of the present disclosure is briefly described above with respect to the basic structure and working principle and the alternative structure of each module, and it will be further described below with reference to three specific embodiments.

First Embodiment

As illustrated in FIGS. 10-14, in an embodiment of the present disclosure, there is provided a magnetic circuit structure of a transducer. The magnet sets include a first magnet set S1 that is magnetized along a moving direction of the transducer, and a second magnet set S2 and a third magnet set S3 that are located in a direction orthogonal to a static magnetic field generated by the first magnet set S1. The third magnet set S3 is disposed in a direction orthogonal to static magnetic fields generated by the first magnet set S1 and the second magnet set S2, the magnetization direction of the second magnet set S2 is orthogonal to the magnetization direction of the first magnet set S1, and the magnetization direction of the third magnet set S3 is orthogonal to the magnetization directions of the second magnet set S2 and the first magnet set S1, and the third magnet set S3 is configured to increase the magnetic induction intensity of the static magnetic field. The first magnet set S1, the second magnet set S2 and the third magnet set S3 may be permanent magnets or electromagnets.

In this example, the magnetization direction of the second magnet set S2 is orthogonal to the magnetization direction of the first magnet set S1, and the magnetization direction of the third magnet set S3 is orthogonal to the magnetization directions of the second magnet set S2 and the first magnet set S1. In such arrangement, through the interaction of the three magnet sets, the magnetic induction intensity of the static magnetic field of the magnetic circuit structure of the transducer is significantly improved.

Figure 7:
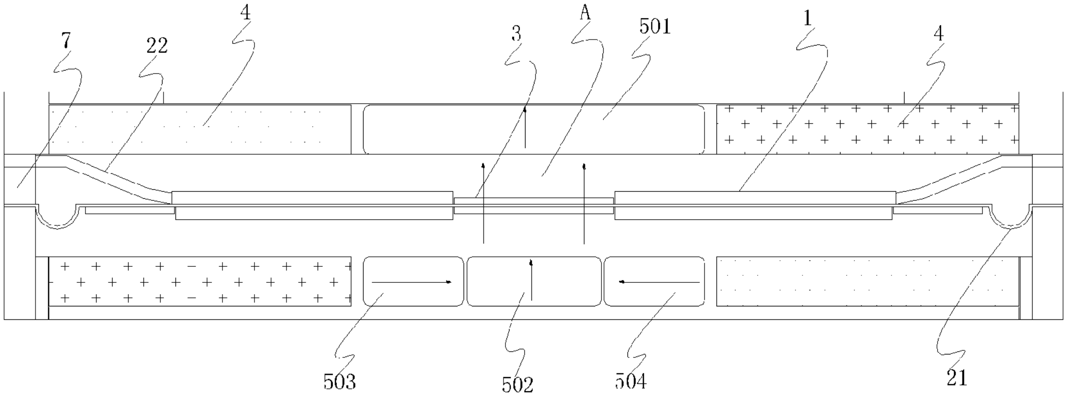
FIG. 7 is a schematic diagram of an overall structure of a magnetic-potential loudspeaker according to a first embodiment of the present disclosure.

As illustrated in FIG. 7, in this embodiment, the first magnet set includes at least two permanent magnets disposed opposite to each other for forming the static magnetic field. The second magnet set includes a magnetism gathering permanent magnet at least disposed on both sides of one of the permanent magnets. The third magnet set includes a magnetism gathering permanent magnet between a plurality of first and second magnet sets located on both sides of the static magnetic field.

As an example, one permanent magnet is disposed on each side of the static magnetic field. Magnetism gathering permanent magnets are disposed on both sides of one permanent magnet or two permanent magnets in a radial direction of the static magnetic field. The two magnetism gathering permanent magnets are disposed opposite to each other.

As an example, a plurality of permanent magnets are disposed on both sides of the static magnetic field in pairs.

A magnetism gathering permanent magnet is disposed between two permanent magnets on the same side of the static magnetic field.

For example, the first permanent magnets and second permanent magnets on the same side of the static magnetic field in the magnetic circuit structure of the transducer are divided into multiple sets, and the magnetism gathering permanent magnet is arranged between the multiple sets.

Of course, the arrangement of the first magnet set, the second magnet set and the third magnet set are not limited to the above-mentioned embodiments, and those skilled in the art may design according to actual needs, as long as the third magnet set can improve the magnetic induction intensity of the static magnetic field.

For example, as illustrated in FIG. 7, on one side of the third magnet set, the first magnet set includes a first permanent magnet 501 and a second permanent magnet 502 disposed opposite to each other in the moving direction of the transducer. The first permanent magnet 501 and the second permanent magnet 502 are magnetized along the moving direction of the transducer. A static magnetic field is formed in the moving direction of the transducer, and polarities of adjacent ends of the first permanent magnet 501 and the second permanent magnet 502 are opposite. In this example, the first permanent magnet 501 and the second permanent magnet 502 are both magnets having bar shape, and directions of the internal magnetic induction lines of the first permanent magnet 501 and the second permanent magnet 502 are the same. For example, a N-pole faces upwards, a S-pole faces downwards, and the static magnetic field A that is formed between the two permanent magnets is directed upward. The first magnet set has a simple structure and the arrangement is easy.

In this example, as illustrated in FIG. 7, a volume of the second permanent magnet 502 is smaller than a volume of the first permanent magnet 501. The second magnet set S2 includes a third permanent magnet 503 and a fourth permanent magnet 504 disposed on both sides of the second permanent magnet. The third permanent magnet 503 and the fourth permanent magnet 504 are magnetized in a direction orthogonal to the static magnetic field, and have the same polarities at ends close to the second permanent magnet 502. The first magnetism gathering permanent magnet includes the third permanent magnet 503 and the fourth permanent magnet 504. In this example, the second permanent magnet 502, the third permanent magnet 503, and the fourth permanent magnet 504 are arranged side by side, and long sides of the three permanent magnets are parallel to each other. Since the volume of the first permanent magnet 501 is larger than the volume of the second permanent magnet 502, the magnetic lines of force can be effectively gathered and the overflow of the magnetic field can be reduced, and a stable static magnetic field A can be formed. For example, the length of the long side of the first permanent magnet 501 is equal to the sum of the lengths of the long sides of the second permanent magnet 502, the third permanent magnet 503 and the fourth permanent magnet 504. In such arrangement, the structural balance on both sides of the static magnetic field can be ensured and the assembly deviation can be prevented.

FIG. 7 only shows one set located on one side of the third magnet set. The other side of the third magnet set is also provided with a set in the same arrangement, but in this set, the polarity of each permanent magnet is opposite to the polarity of the set of permanent magnet shown in FIG. 7. In this example, the alternating magnetic field generating device is a coil 4 fixed on the magnetic-potential loudspeaker and arranged in the horizontal direction. The movable member C of the loudspeaker includes a movable device, the movable device includes a magnetic conductive material 1, and the magnetic conductive material 1 has a magnetic converging effect. The movable member C further includes a suspension device 2. The suspension device 2 is provided with an elastic recovery device, and specifically includes a diaphragm 21 and a leaf spring 22, and the diaphragm 21 provides an elastic restoring force at an edge portion thereof and thus constitutes a part of the elastic recovery device. A reinforcement member 3 is disposed on the diaphragm 21.

Specifically, as illustrated in FIG. 7, when an alternating current signal passes through the coil 4, the magnetic conductive material 1 in the coil may be polarized by an alternating magnetic field, so that one end thereof is an N-pole and one end is an S-pole, and the first magnet set and the second magnet set arranged in parallel with the magnetic conductive material 1 may also be configured so that the magnetic poles of the two corresponding ends are opposite, that is, one of the opposite ends is an S-pole and the other thereof is an N-pole. In addition, one end of the magnetic conductive material 1 is located in the static magnetic field A at the same time, so that the magnetic conductive material 1 reciprocally moves by the interaction of the static magnetic field A and the alternating magnetic field B.

On the other hand, the magnetic conductive material 1 is directly connected to and fixed to the diaphragm 21. It will be understood that when the magnetic conductive material 1 reciprocally moves, the flexible diaphragm 21 may be driven to reciprocally moves, and a sound wave generated by the vibration of the diaphragm 21 propagates to the outside through a sound hole 6. The diaphragm 21 may also function to isolate a front cavity and a rear cavity of the loudspeaker.

Further, as mentioned above, in the movable member C, the suspension device 2 further includes a leaf spring 22, one end of the leaf spring 22 is connected to and fixed to the diaphragm 21 and the other end thereof is fixed to a bracket 7, so that an elastic restoring force for a reciprocal motion of the movable member may be provided to making the movable member return to the balance position.

Specifically, in the embodiment, the leaf spring 22 acts as an anti-stiffness balance device. The anti-stiffness is also referred to as magnetic stiffness, that is, when the magnetic conductive material (including soft and hard magnetic materials) approaches an area with high magnetic flux density, a force applied on it gradually increases and is in the same direction as the moving direction thereof. The ratio of the applied force to the displacement is referred to as the anti-stiffness of the magnetic conductive material. The following factors may be considered when determining the specific configurations thereof:

1) The magnitude of the anti-stiffness in the micro-transducer is measured through simulation or experiment. If the anti-stiffness is non-linear, it is necessary to measure a curve of the static magnetic field force received by the movable device varying with respect to its displacement through simulation or measurement.

2) Obtain the stiffness requirements of a force balance device according to the design requirements for the first-order resonant frequency and the measurement results of the anti-stiffness. At least one anti-stiffness balance device is designed according to the requirements and an internal spatial structure of the micro-transducer. The anti-stiffness balance device may has various forms, such as the aforementioned leaf spring 22, spring, magnetic spring, etc.

In addition to the above factors, the design of the anti-stiffness balance device shall follow its own requirements, in the case of the structure of the leaf spring or spring, it is necessary that a stress generated when it is stretched or compressed to an ultimate displacement is less than the yield strength of the member; and in the case of the structure of the magnetic spring, it is necessary that when it is stretched or compressed to an ultimate displacement, it does not exceed the range of the magnetic field force thereof.

It can be seen that in the embodiment, in addition to the elastic recovery function of the diaphragm 21, the anti-stiffness may be balanced by additionally providing an anti-stiffness balance device. Such design may bring the following advantages:

a) The balance of the stiffness and the anti-stiffness of the force balance device are individually designed, and thus the driving force may be designed independently without considering the magnitude of anti-stiffness. Compared with the moving-coil loudspeaker, the magnetic-potential transducer of the present disclosure has high conversion efficiency, the first-order resonance frequency of the system may be effectively reduced by the anti-stiffness, and the low-frequency performance of the system is improved.

b) The stiffness of the force balance device is only dependent on its own structure, so that the total stiffness of the system may be adjusted by adjusting the stiffness, thereby indirectly adjusting the first-order resonant frequency of the system.

Second Embodiment

According to the second embodiment, there is provided another magnetic circuit structure of a transducer. It is different from the first embodiment in that the second magnet set includes a fourth magnet set and a fifth magnet set respectively disposed on both sides of the first permanent magnet and the second permanent magnet. Each of the fourth magnet set and the fifth magnet set includes two permanent magnets that are disposed correspondingly and located in a direction orthogonal to the static magnetic field, and the two permanent magnets are magnetized in a direction orthogonal to the moving direction and are configured to have the same polarities at ends close to the first permanent magnet and the second permanent magnet.

In this example, by providing the magnetism gathering permanent magnet on both sides of the first permanent magnet and the second permanent magnet, the magnetic induction intensity of the first permanent magnet and the second permanent magnet in the static magnetic field are significantly improved. Accordingly, the magnetic induction intensity of the static magnetic field is improved.

Figure 8:
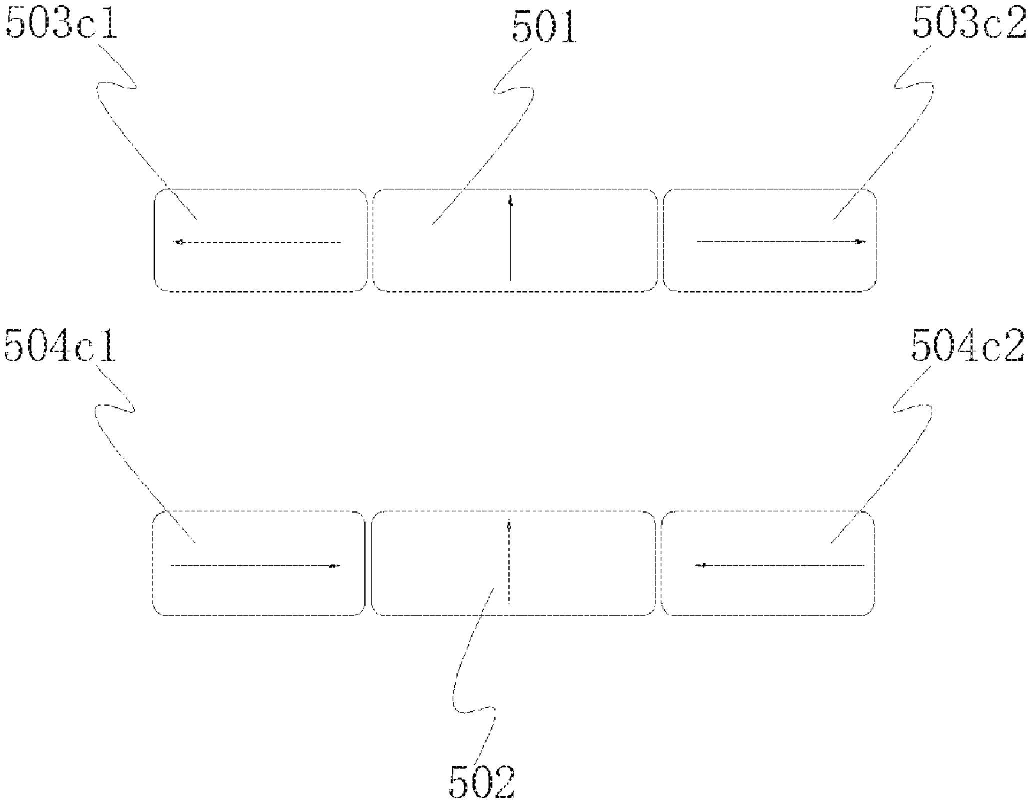
FIG. 8 is a schematic diagram of a structure of a static magnetic field generating device of a magnetic-potential loudspeaker according to a second embodiment of the present disclosure.

FIG. 8 is a schematic diagram of a structure of a static magnetic field generating device of the magnetic-potential loudspeaker according to the second Embodiment of the present disclosure.

Specifically, on one side of the third magnet set, two fifth permanent magnets **503*c*1, 503*c*2 are disposed side by side on opposite sides of the first permanent magnet 501. Ends of the two fifth permanent magnets 503*c*1, 503*c*2 close to the first permanent magnet 502 are S-poles, and the other ends thereof are N-poles. The magnetic induction intensity of the static magnetic field below the first permanent magnet 501 is enhanced. Two sixth permanent magnets 504*c*1, 504*c*2 are disposed side by side on opposite sides of the second permanent magnet 502. The ends of the two sixth permanent magnets 504*c*1, 504*c*2 close to the second permanent magnet 502 are N-poles, and the other ends thereof are S-poles. The magnetic induction intensity of the static magnetic field above the second permanent magnet 502 is enhanced. The first magnetism gathering permanent magnet includes two fifth permanent magnets 503*c*1, 503*c*2 and two sixth permanent magnets 504*c*1, 504*c*2**.

In this example, a superimposed and enhanced static magnetic field is formed in an area between the first permanent magnet 501 and the second permanent magnet 502, so that the static magnetic field A in this area is further enhanced. The magnetic conductive material is driven in this region, so that the driving force of the movable member is strengthened.

Likewise, the other side of the third magnet set is also provided with a set in the same arrangement, but in this set, the polarity of each permanent magnet is opposite to the polarity of the set of permanent magnet as shown in FIG. 8.

Third Embodiment

Figure 9:
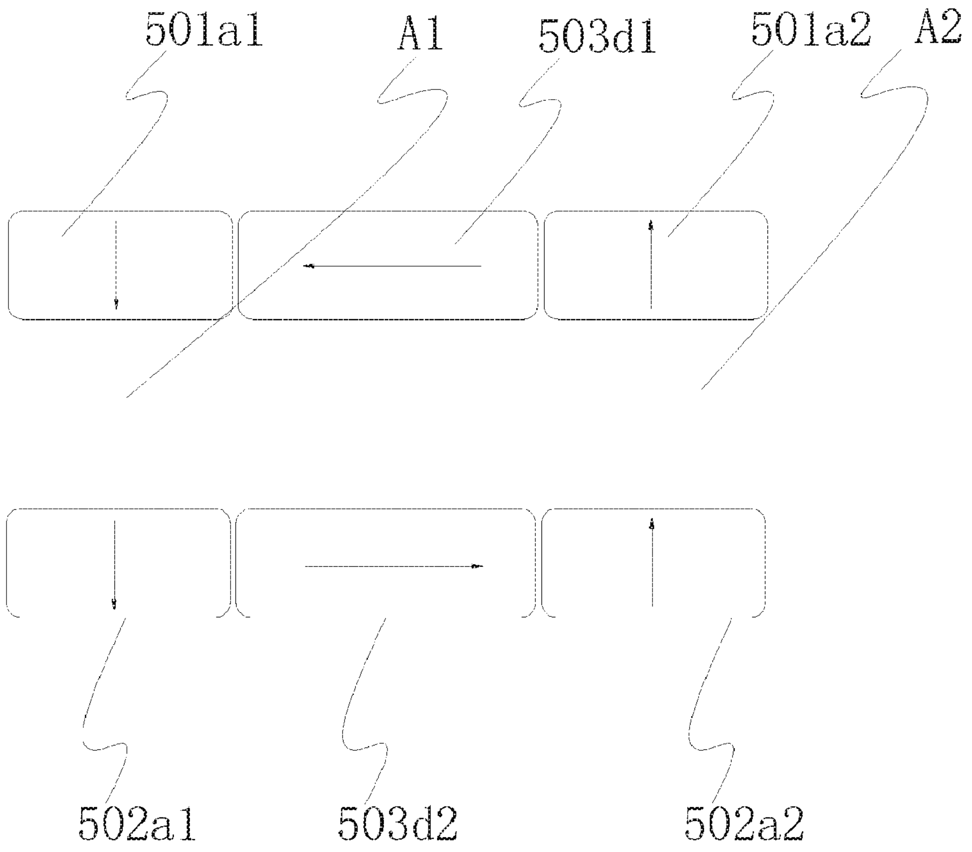
FIG. 9 is a schematic diagram of a structure of a static magnetic field generating device of a magnetic-potential loudspeaker according to a third embodiment of the present disclosure.
Figure 10:
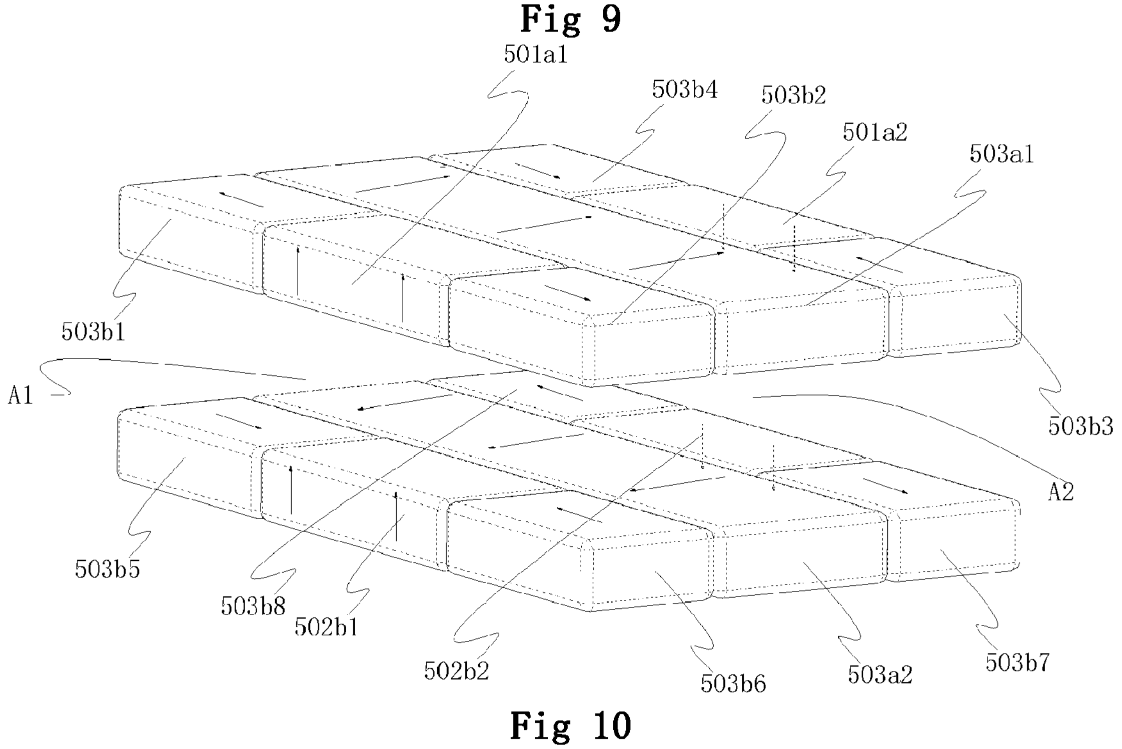
FIG. 10 is a schematic diagram of a structure of a static magnetic field generating device of a magnetic-potential loudspeaker according to a fourth embodiment of the present disclosure.
Figure 11:
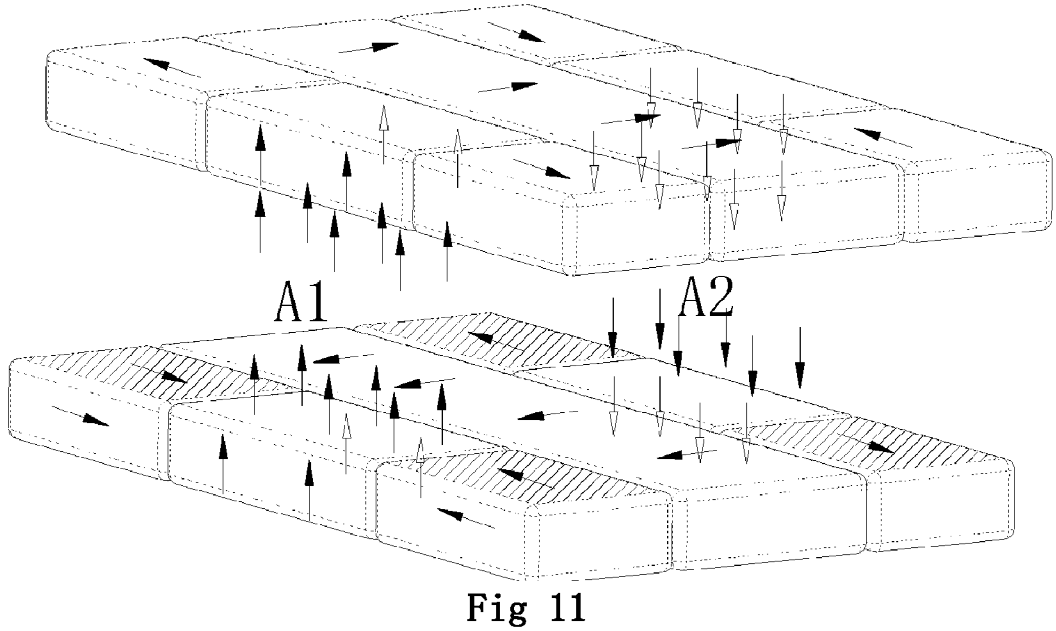
FIG. 11 is a magnetic circuit diagram of the static magnetic field generating device of the magnetic-potential loudspeaker according to the fourth embodiment of the present disclosure.

As illustrated in FIG. 9, there is provided still another magnetic circuit structure of a transducer. It is different from the second embodiment in that a plurality of permanent magnets for generating the static magnetic field are disposed in pairs and the permanent magnets of each pair are opposite to each other, and are magnetized along the moving direction of the transducer, and the polarities of opposite ends of each set of permanent magnets that are opposite to each other are configured to be opposite. A third magnet set is correspondingly provided between two adjacent sets of permanent magnets on each side of the static magnetic field, the third magnet set is provided with at least two second magnetism gathering permanent magnets, and polarities of the two second magnetism gathering permanent magnets at ends close to the same static magnetic field are configured to be opposite.

Specifically, the magnetic pole under the first permanent magnet **501*a*1 which is on the left side is an N-pole, and the magnetic pole above the second permanent magnet 502*a*1 which is on the left side is an S-pole. The magnetic pole under the first permanent magnet 501*a*2 which is on the right side is an S-pole, and the magnetic pole above the second permanent magnet 502*a*2 which is on the right side is an N-pole. The magnetic pole of the left end of a seventh permanent magnet 503*d*1 between the two permanent magnets 501*a*1 and 501*a*2 located above the static magnetic field is an N-pole, and the magnetic pole of the right end thereof is an S-pole. The magnetic pole of the left end of a eighth permanent magnet 503*d*2 between the two second permanent magnets 502*a*1 and 502*a*2 located below the static magnetic field is an S-pole, and the magnetic pole of the right end thereof is an N-pole. The seventh permanent magnet 503*d*1 and the eighth permanent magnet 503*d*2** are the second magnetism gathering permanent magnets.

In this example, the magnetic induction intensity of the static magnetic field A1 between the first permanent magnet **501*a*1 and the second permanent magnet 502 located on the left is enhanced. The magnetic induction intensity of the static magnetic field A2 between the first permanent magnet 501*a*2 and the second permanent magnet 502*a*2 located on the right is enhanced. That is, the seventh permanent magnet 503*d*1 and the eighth permanent magnet 503*d*2**, as the magnetism gathering permanent magnets, effectively enhance the magnetic induction strength of the two static magnetic fields A1 and A2. During assembly, a plurality of magnetic conductive materials is located in the region where the above two static magnetic fields A1 and A2 are located, respectively, thereby significantly improving the driving force of the movable member.

Fourth Embodiment

As illustrated in FIGS. 10-14, there is provided further another magnetic circuit structure of a transducer. In this embodiment, the third magnet set is arranged in the middle of the magnetic circuit structure of the transducer based on the third embodiment.

Specifically, there are two first permanent magnet and two second permanent magnet located on the same side of the static magnetic field the magnetization directions of the two first permanent magnets are opposite, and the magnetization directions of the two second permanent magnets are opposite. The third magnet set includes two second magnetism gathering permanent magnets, which are respectively disposed between the two first permanent magnets and between the two second permanent magnets, the magnetization directions of the two second magnetism gathering permanent magnets are opposite. In this embodiment, it can be seen that the first magnet set S1 is magnetized along the vertical direction, i.e. Z direction, the second magnet set S2 is magnetized along the horizontal direction, i.e. X direction, and the third magnet set S3 is magnetized along the direction of paper surface, i.e. Y direction.

More specifically, a magnetic circuit system is formed in this example. Seven permanent magnets are arranged on each of the upper and lower sides of the static magnetic fields A1 and A2. For convenience of description, permanent magnets located at corners of the overall magnetic circuit structure of the transducer are defined as corner permanent magnets. The second magnetism gathering permanent magnet includes a ninth permanent magnet. The first magnetism gathering permanent magnet includes the corner permanent magnets.

On the upper side of the static magnetic field, the magnetic pole of the right end of the ninth permanent magnet 503*a*1 is an N-pole, and the magnetic pole of the left end is an S-pole. The magnetic pole of the lower end of the first permanent magnet 501*a*1 in the left magnet set is an S-pole, and the magnetic pole of the upper end is an N-pole. The magnetic pole of an end of a distal end corner permanent magnet 503*b*1 close to the first permanent magnet 501*a*1 is an S-pole, and the magnetic pole of an end away from the first permanent magnet 501*a*1 is an N-pole. The magnetic pole of an end of a near end corner permanent magnet 503*b*2 close to the first permanent magnet 501*a*1 is an S-pole, and the magnetic pole of an end away from the first permanent magnet 501*a*1 is an N-pole. The magnetic pole of the lower end of the first permanent magnet 501*a*2 in the right magnet set is an N-pole, and the magnetic pole of the upper end is an S-pole. The magnetic pole of an end of a distal end corner permanent magnet 503*b*4 close to the first permanent magnet 501*a*2 is an N-pole, and the magnetic pole of an end away from the first permanent magnet 501*a*2 is an S-pole. The magnetic pole of an end of a near end corner permanent magnet 503*b*3 close to the first permanent magnet 501*a*2 is an N-pole, and the magnetic pole of an end away from the first permanent magnet 501*a*2 is an S-pole. Accordingly, an enhanced static magnetic field is formed under the magnet set.

On the upper side of the static magnetic field, the second permanent magnets 502*b*1, 502*b*2 in the lower magnet set have the same polarities as that of the first permanent magnets 502*a*1, 502*a*2 in the upper magnet set. That is, the directions of the internal magnetic induction lines are the same. The polarities of the ninth permanent magnet 503*a*2, the corner permanent magnets 503*b*5, 503*b*6, 503*b*7 and 503*b*8 in the lower magnet set are opposite to that of the ninth permanent magnet 503*a*1, the corner permanent magnets 503*b*1, 503*b*2, 503*b*3 and 503*b*4 in the upper magnet set. That is, the directions of the internal magnetic induction lines are the same. Accordingly, an enhanced static magnetic field is formed above the magnet set.

Specifically, since a plurality of second permanent magnets 503*a*1, 503*a*2, 503*b*1, 503*b*2, 503*b*3, 503*b*4, 503*b*5, 503*b*6, 503*b*7, 503*b*8 are disposed around the first permanent magnets 501*a*1, 501*a*2, and the second permanent magnets 502*b*1, 502*b*2 of each magnet set, the magnetic lines of force around the first permanent magnets 501*a*1, 501*a*2, and the second permanent magnets 502*b*1, 502*b*2 can be effectively gathered and induced. As such, the magnetic induction intensities of the static magnetic field A1 between the first permanent magnet 501*a*1 and the second permanent magnet 502*b*1 and the static magnetic field A2 between the first permanent magnet 501*a*2 and the second permanent magnet 502*b*2 are significantly enhanced. During operation, a plurality of magnetic conductive materials is located in the region where the above two static magnetic fields A1 and A2 are located, respectively, thereby significantly improving the driving force of the movable member.

In the present disclosure, it should be noted that: 1) The magnetic conductive material 1 may have a flat sheet structure, may be provided as one piece, or two pieces, or may be provided as multiple sets, and the number of magnetizers provided for each set of magnetic conductive material is not limited. Also, the magnetic conductive material does not necessarily have to be constituted by independent magnetizers. For example, when the magnetic conductive material is connected to the diaphragm, it may be a magnetic conductive material covering a part of the surface of the diaphragm by ways such as coating on the surface of the diaphragm. 2) In order to make the vibration of the movable device tends to be balance, the magnetic conductive material is preferably symmetrically provided on both surfaces of the diaphragm, and of course, when there are multiple sets of magnetic conductive material, the magnetic conductive materials may be staggered. 3) In specific implementations, the present disclosure may be applied not only to a square transducer, but also to a circular or other shaped transducer structure, and accordingly, the diaphragm may be square or circular or the like. 4) The number of static magnetic field generating device, alternating magnetic field generating device, movable device and suspension device in the magnetic-potential transducer may be one or more.

Figure 12:
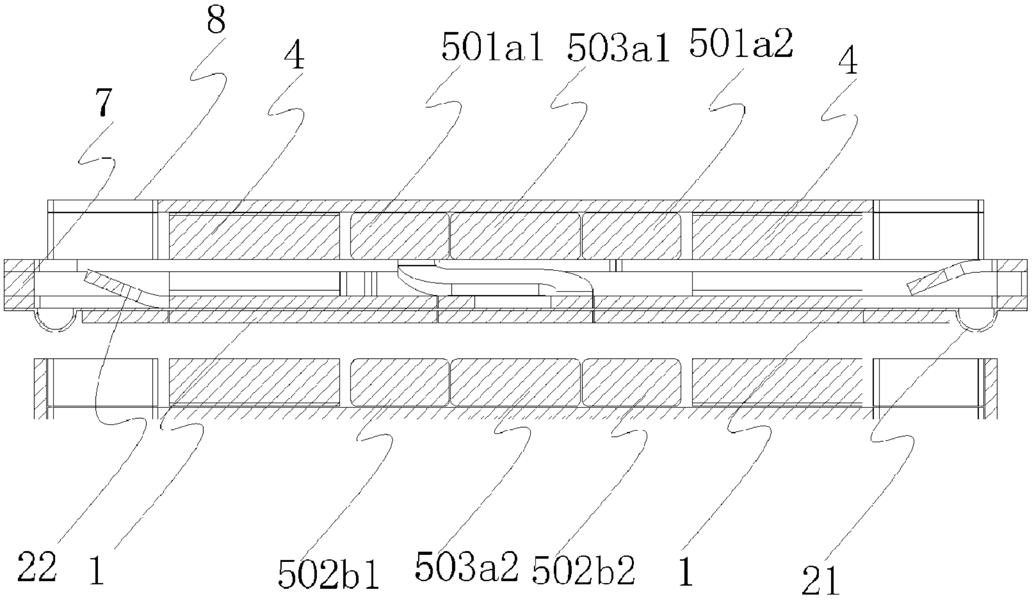
FIG. 12 is a cross-sectional view of the magnetic-potential transducer according to the fourth embodiment of the present disclosure.
Figure 13:
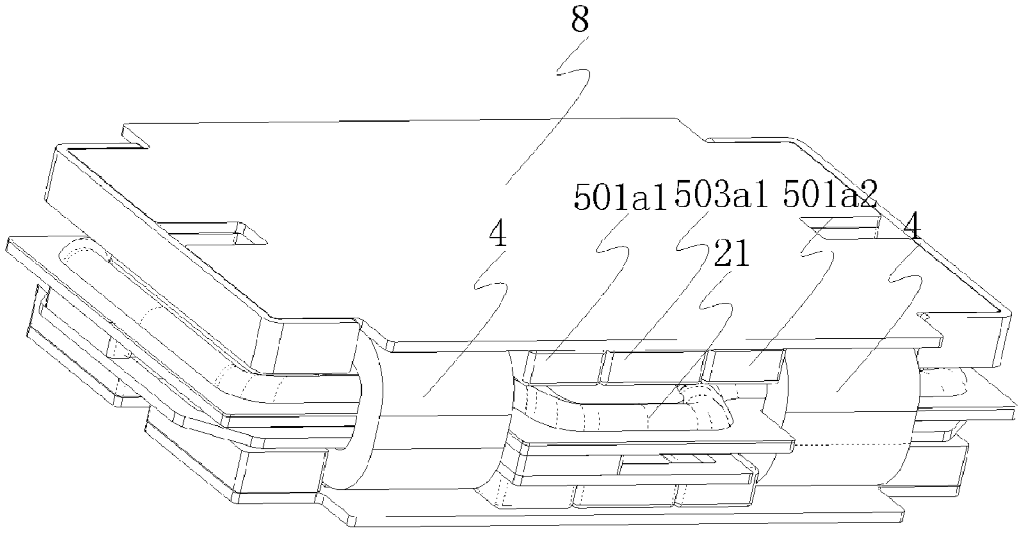
FIG. 13 is a perspective view of the magnetic-potential transducer according to the fourth embodiment of the present disclosure.
Figure 14:
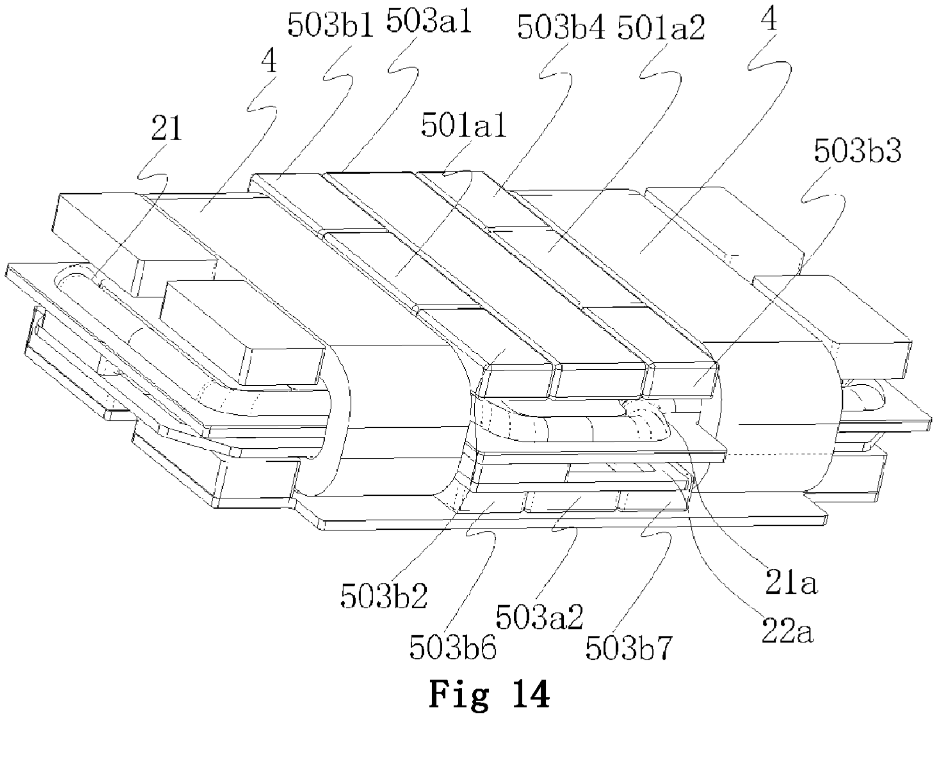
FIG. 14 is a perspective view of the magnetic-potential transducer without a structural member according to the fourth embodiment of the present disclosure.

FIG. 12 is a cross-sectional view of the magnetic-potential transducer according to the fourth embodiment of the present disclosure. FIG. 13 is a perspective view of the magnetic-potential transducer according to the fourth embodiment of the present disclosure. FIG. 14 is a perspective view of the magnetic-potential transducer without a structural member according to the fourth embodiment of the present disclosure.

In the embodiment of the present disclosure, the magnetic-potential transducer includes two coils 4 arranged opposite to each other in an axial direction. The magnetic circuit system of the transducer is as described above. Two sets of magnetic conductive material 1 are respectively polarized by the two coils 4, and are respectively located in the static magnetic field A1 (that is, between the first permanent magnet 501*a*1 and the second permanent magnet 502*b*) and the static magnetic field A2 (that is, between the first permanent magnet 501*a*2 and the second permanent magnet **502*b*2). Both ends of the diaphragm 21 and the leaf spring 22 in the long side direction respectively pass through the two coils 4 and are fixed on the bracket 7. A structural member 8 is also provided on outside of the coil 4 and the magnetic circuit structure of the transducer. The structural member 8 may protect the coil 4, the diaphragm 21**, the magnetic circuit structure of the transducer, etc.

A short side of the magnetic circuit structure of the transducer is parallel to a long side of the magnetic-potential transducer. The diaphragm 21 is provided with a first outward convex portion **21*a* in the long side direction of the magnetic circuit structure of the transducer at a position corresponding to the magnetic circuit structure of the transducer, and the first outward convex portion 21*a* increases an effective vibration area of the diaphragm 21**, and improves sound production effect.

In addition, the leaf spring 22 is provided with a second outward convex portion **22*a* corresponding to the first outward convex portion 21*a*. The second outward convex portion 22*a* may effectively extend a length of an elastic bar of the leaf spring 22** in the long side direction of the magnetic-potential transducer, thereby increasing the amplitude of the movable member.

In addition, the first outward convex portion **21*a* and the second outward convex portion 22*a* make full use of a space of the coil 4** in a thickness direction, and improve the space utilization of the magnetic-potential transducer.

According to another aspect of the present disclosure, there is also provided an electronic device including the above-mentioned magnetic-potential transducer, the electronic device has high energy conversion efficiency and good low-frequency performance.

The magnetic-potential transducer of the present disclosure has excellent adaptability to products of different sizes and may be widely used in different applications. For example, it may be applied to electronic devices such as mobile phones, tablets, TVs, car audios or loudspeaker boxes.

Although some specific embodiments of the present disclosure have been described in detail by way of example, those skilled in the art should understand that the above examples are only for illustration and are not intended to limit the scope of the present disclosure. Those skilled in the art should understand that the above embodiments can be modified without departing from the scope and spirit of the present disclosure. The scope of the present disclosure is defined by the appended claims.

What is claimed is:

1. A magnetic circuit structure of a transducer, wherein the magnetic circuit structure comprises a static magnetic field generating device, the static magnetic field generating device comprises magnet sets, wherein the magnet sets comprise a first magnet set that is magnetized in a moving direction of the transducer, a second magnet set that is located in a direction orthogonal to a static magnetic field generated by the first magnet set, and a third magnet set disposed in a direction orthogonal to static magnetic fields generated by the first magnet set and the second magnet set, and wherein a magnetization direction of the second magnet set is orthogonal to a magnetization direction of the first magnet set, a magnetization direction of the third magnet set is orthogonal to the magnetization directions of the second magnet set and the first magnet set, and the second magnet set and third magnet set are provided to increase magnetic induction intensity of the static magnetic field.

2. The magnetic circuit structure of the transducer of claim 1, wherein the first magnet set comprises at least two permanent magnets disposed opposite to each other to form the static magnetic field, the second magnet set comprises first magnetism gathering permanent magnets disposed on both sides of at least one of the permanent magnets, and the third magnet set comprises second magnetism gathering permanent magnets located on both sides of the static magnetic field and between the first magnet set and the second magnet set.

3. The magnetic circuit structure of the transducer of claim 2, wherein the permanent magnets for generating the static magnetic field are disposed in pairs and the permanent magnets of each pair are opposite to each other, the permanent magnets are magnetized in the moving direction of the transducer, and polarities of opposite ends of the permanent magnets that are opposite to each other of each pair are configured to be opposite, wherein the third magnet set is correspondingly provided between two adjacent sets of permanent magnets on each side of the static magnetic field generated by the first magnet set and the second magnet set, and wherein the polarities of the two second magnetism gathering permanent magnets at ends close to the same static magnetic field are configured to be opposite.

4. The magnetic circuit structure of the transducer of claim 1, wherein the first magnet set comprises a first permanent magnet and a second permanent magnet disposed opposite to each other in the moving direction of the transducer, the first permanent magnet and the second permanent magnet are magnetized in the moving direction of the transducer and form the static magnetic field in the moving direction of the transducer, and adjacent ends of the first permanent magnet and the second permanent magnet have opposite polarities.

5. The magnetic circuit structure of the transducer of claim 4, wherein the second magnet set comprises a fourth magnet set and a fifth magnet set respectively disposed on both sides of the first permanent magnet and the second permanent magnet, and wherein each of the fourth magnet set and the fifth magnet set comprises two permanent magnets disposed opposite to each other and located in the direction orthogonal to the static magnetic field generated by the first magnet set, and the two permanent magnets are magnetized in a direction orthogonal to the moving direction and are configured to have the same polarities at ends close to the first permanent magnet and the second permanent magnet.

6. The magnetic circuit structure of the transducer of claim 5, wherein the third magnet set is arranged in the middle of the magnetic circuit structure of the transducer.

7. The magnetic circuit structure of the transducer of claim 6, wherein there are two first permanent magnets and two second permanent magnets located on the same side of the static magnetic field, directions of magnetic induction lines inside the two first permanent magnets are opposite, and directions of magnetic induction lines inside the two second permanent magnets are opposite, and wherein the third magnet set comprises two second magnetism gathering permanent magnets respectively disposed between the two first permanent magnets and between the two second permanent magnets, and directions of magnetic induction lines inside the two third magnet sets are opposite.

8. The magnetic circuit structure of the transducer of claim 4, wherein a volume of the second permanent magnet is smaller than a volume of the first permanent magnet, wherein a fifth magnet set comprises a third permanent magnet and a fourth permanent magnet disposed on both sides of the second permanent magnet, and wherein the third permanent magnet and the fourth permanent magnet are magnetized in the direction orthogonal to the static magnetic field generated by the first magnet set, and have the same polarities at ends close to the second permanent magnet.

9. An electronic device, comprising the magnetic circuit structure of the transducer of claim 1.

10. The electronic device of claim 9, wherein the electronic device is a mobile phone, a tablet, a TV, a car audio or a loudspeaker box.

11. A transducer, comprising a fixed member and a movable member, wherein the fixed member comprises:

a static magnetic field generating device, the static magnetic field generating device comprises magnet sets, wherein the magnet sets comprise a first magnet set that is magnetized in a moving direction of the transducer, and a second magnet set that is located in a direction orthogonal to a static magnetic field generated by the first magnet set, and a third magnet set disposed in a direction orthogonal to static magnetic fields generated by the first magnet set and the second magnet set, and wherein a magnetization direction of the second magnet set is orthogonal to a magnetization direction of the first magnet set, a magnetization direction of the third magnet set is orthogonal to the magnetization directions of the second magnet set and the first magnet set, and the second magnet set and third magnet set are provided to increase magnetic induction intensity of the static magnetic field.

12. The transducer of claim 11, wherein the transducer is a magnetic-potential transducer, and the transducer further comprises:

at least one alternating magnetic field generating device configured to generate an alternating magnetic field, the alternating magnetic field is orthogonal or partially orthogonal to the static magnetic field; and at least one movable device provided with a magnetic conductive material, at least a part of the magnetic conductive material is arranged in an area where the alternating magnetic field overlaps with the static magnetic field, so that the static magnetic field and the alternating magnetic field are converged, wherein a magnetic field force generated by an interaction between the static magnetic field and the alternating magnetic field is applied to the magnetic conductive material so as to drive the movable member to move.

13. The transducer of claim 12, wherein the transducer further comprises a suspension device, the magnetic conductive material and the suspension device move together as a whole, and the movable device is suspended in a space where the static magnetic field is located by the suspension device.

14. The transducer of claim 11, wherein the transducer moves in a vertical direction, the first magnet set is magnetized in the vertical direction, and the second magnet set is magnetized in a horizontal direction.

* * * * *